US011785274B2

(12) United States Patent
Hawthorne

(10) Patent No.: US 11,785,274 B2
(45) Date of Patent: Oct. 10, 2023

(54) PROTECTED CLIENT INVENTORY REDEPLOYMENT

(71) Applicant: ARRIS Enterprises LLC, Suwanee, GA (US)

(72) Inventor: Philip B. Hawthorne, Craigavon (GB)

(73) Assignee: ARRIS Enterprises LLC, Suwanee, GA (US)

( * ) Notice: Subject to any disclaimer, the term of this patent is extended or adjusted under 35 U.S.C. 154(b) by 37 days.

(21) Appl. No.: 16/838,913

(22) Filed: Apr. 2, 2020

(65) Prior Publication Data
US 2020/0322668 A1    Oct. 8, 2020

Related U.S. Application Data

(60) Provisional application No. 62/828,754, filed on Apr. 3, 2019.

(51) Int. Cl.
*H04N 21/266* (2011.01)
*H04N 21/235* (2011.01)
*H04N 21/258* (2011.01)

(52) U.S. Cl.
CPC ... *H04N 21/26609* (2013.01); *H04N 21/2351* (2013.01); *H04N 21/25816* (2013.01)

(58) Field of Classification Search
CPC ......... H04N 21/26609; H04N 21/2351; H04N 21/25816
See application file for complete search history.

(56) References Cited

U.S. PATENT DOCUMENTS

| 5,870,474 A * | 2/1999 | Wasilewski ...... H04N 21/23476 348/E5.004 |
| 2003/0219127 A1* | 11/2003 | Russ ................. H04N 21/4405 380/239 |
| 2004/0260798 A1* | 12/2004 | Addington ......... H04N 21/6581 709/223 |
| 2011/0202642 A1* | 8/2011 | Shimizu ............ H04N 21/4432 709/221 |
| 2012/0072951 A1* | 3/2012 | King ................... H04N 21/485 725/37 |

(Continued)

OTHER PUBLICATIONS

PCT International Search Report & Written Opinion, RE: Application No. PCT/US2020/026452 dated Jun. 30, 2020.

(Continued)

*Primary Examiner* — Randy A Flynn
(74) *Attorney, Agent, or Firm* — Chernoff, Vilhauer, McClung & Stenzel, LLP

(57) ABSTRACT

The systems and method disclosed herein address introduce identifiers within the individual entitlement management messages (EMMs) addressed to that client that uniquely identify the combination of system and subscriber account to which the client is deployed, and use of them to issue automatic 'factory reset' behavior when the client is re-authorized for the new subscriber. In one embodiment, the EMM messages used to trigger the reset behavior are cryptographically signed specifically for the individual client to ensure that such a message cannot be maliciously sent by an untrusted third party. The facility to deliver such a message is already available within the conditional access system (CAS).

19 Claims, 5 Drawing Sheets

(56) References Cited

U.S. PATENT DOCUMENTS

2014/0373040 A1* 12/2014 Lin .................... H04N 21/4126
                                                                725/25
2016/0037196 A1    2/2016 Peters et al.
2016/0249076 A1    8/2016 Nagravision et al.
2017/0374104 A1* 12/2017 Apsangi ............. H04N 21/4753

OTHER PUBLICATIONS

Extended European Search Report in European Patent Application No. 20785365.6-1218, dated Nov. 18, 2022.

* cited by examiner

PROTECTED CLIENT INVENTORY REDEPLOYMENT

CROSS-REFERENCE TO RELATED APPLICATIONS

This application claims benefit of U.S. Provisional Patent Application No. 62/828,754, entitled "PROTECTED CLIENT INVENTORY REDEPLOYMENT," by Philip Hawthorne, filed Apr. 3, 2019, which application is hereby incorporated by reference herein.

BACKGROUND

1. Field

The present disclosure relates to systems and methods for disseminating content, and in particular to a system and method for remotely reconfiguring client devices that receive and process such content.

2. Description of the Related Art

Network operators utilizes conditional access (CA) software and underlying hardware on the client devices such as set top boxes (STBs), integrated receiver decoders (IRDs), or conditional access modules (CAMs) in their network to protect the content they distribute. In normal operation on a single network, the protocols and message contents result in entitlements and other related information being conveyed in entitlement management messages (EMMs), the contents of which can be stored persistently on the client device. This storage also contains encryption keys and housekeeping metadata related to history of the messages already processed by that client device on that specific network, and for the specific end subscriber in possession of the client device, keys for the decrypting content they are authorized to consume). Local storage of content can also be performed by the client device 106 middleware, for example, as is known with personal video recorders (PVRs).

This works well when the client device operating on a single network with a single end subscriber, operational issues arise from such locally stored content when the client device is reconfigured or moved between subscribers, or even between networks such that a client device with 'history' from one subscriber or network will not function correctly for another subscriber or on another network. This is normally addressed by applying a 'factory reset' at the client device when it is being redeployed, but this often involves physical local intervention at the client device itself, and can occasionally be forgotten, resulting in a potentially costly maintenance operation on the subscriber's premises, or return of the client device to the operator.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for a method of reconfiguring a client device. The client device receives a plurality of entitlement messages via a messaging protocol, at least a portion of the plurality of entitlement messages comprising conditional access information including one or more content protection keys for decrypting content provided to and stored by the client device. In one embodiment, the method comprises receiving and storing, in secure memory of the client device, credentials provisioned to the client device. The credentials comprise a subscriber identifier and a first network identifier. The method also comprises receiving an entitlement message, the received entitlement message having a second subscriber identifier and a second network identifier, comparing the second subscriber identifier with the stored first subscriber identifier and the second network identifier with the stored first network identifier, and triggering a client device reset procedure according to the comparison.

Another embodiment is evidenced by a processor having a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The systems and method disclosed herein address introduce identifiers within the individual entitlement management messages (EMMs) addressed to that client that uniquely identify the combination of system and subscriber account to which the client is deployed, and use of them to issue automatic 'factory reset' behavior when the client is re-authorized for the new subscriber. In one embodiment, the EMM messages used to trigger the reset behavior are cryptographically signed specifically for the individual client to ensure that such a message cannot be maliciously sent by an untrusted third party. The facility to deliver such a message is already available within the conditional access system (CAS).

While it would still in many cases be appropriate to manually refurbish a client device prior to providing it for re-use with a new subscriber, the invention ensures that failing to do so does not impact on the ability to use the client device in its new deployment, and prevents the new subscriber having access to an operational device containing data or content (such as recorded content) from another subscriber.

Content Distribution System

Figure 1:
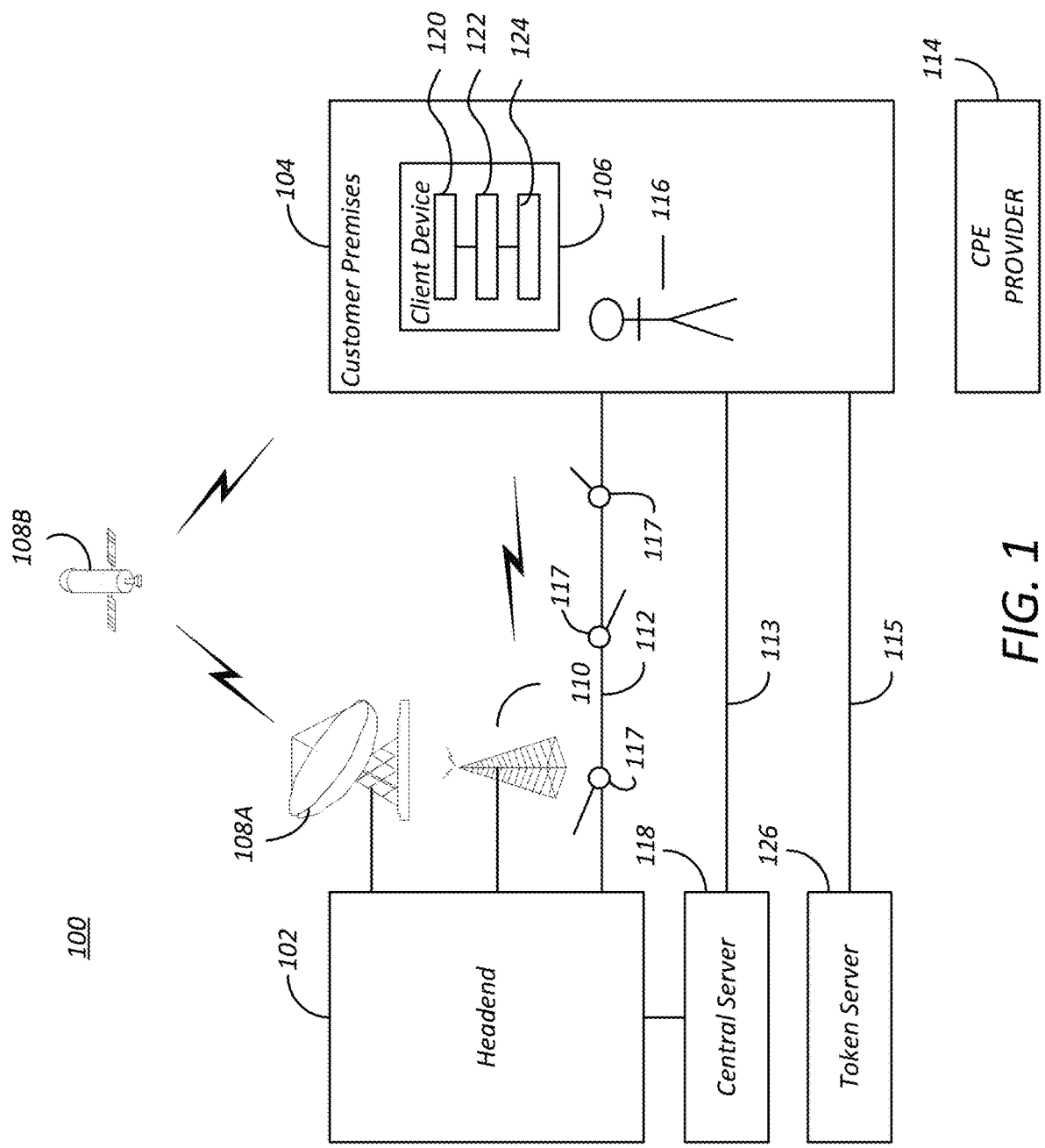
FIG. 1 is a diagram of an exemplary content distribution network.

FIG. 1 is a diagram of an exemplary content distribution network (CDN) 100. The CDN 100 comprises content source or headend 102. The headend 102 may be a multi system operator MSO that transmits content to a client devices 106 in possession of end users 116 (subscribers) or a content provider that generates content and transmits the content to client devices 106 in possession of MSOs (for eventual transmission to end users). Exemplary client devices 106 include set top boxes (STBs), cable modems, and integrated receiver/decoders, but may also be embodied in smart phones, tablet computers, desktop computers, laptop computers, or any device capable of receiving, storing, retransmitting, or presenting content. Client devices 106 are alternatively referred to as customer provided equipment (CPEs) in the following disclosure.

The client device 106 includes the processor 122 communicatively coupled to a typically volatile and random access memory 120 and a non-volatile read only memory 124, which may be a secure memory. Typically, the client device 106 is installed in the customer premises 104 such as a home or MSO facility, but the client device 106 may be installed in motor vehicle or be carried on the user's person. In many instances, the client devices 106 provided to the users 116 are manufactured (at least in part) by a client device provider 114. In some embodiments, the client device provider 114 manufactures client devices 106 of one hardware design that can be used with different headends 102, each having different functional requirements. Typically, this is accomplished through modification of the software and/or firmware of the client device 106. The client device provider 114 may also manufacture client devices 106 with different hardware functionality for different headends 102. Typically, the data transmitted between the headend 102 and the client devices 106 is encrypted or otherwise obfuscate it to protect it from being received by unauthorized entities. Consequently, client devices 106 typically include a conditional access system (CAS) that decrypts the data transmitted by the headend 102 and may also have the capability to encrypt data transmitted from the client device 106 to the headend 102.

The headend 102 may transmit data via a wired network 112 that includes a plurality of communication nodes 117 interconnected by optical cable or conductive wire. The headend 102 may also transmit data via a wireless connection such as via a terrestrial transmitter 110 or a satellite broadcast system in which data is transmitted via a ground station 108A and a satellite 108B.

In some cases, the CDN 100 also permits the users' client device 106 to transmit information to the headend 102 or a central server 118, such as a licensing server. Accordingly, the CDN 100 permits information to be transceived (e.g. transmitted and received) by the headend 102 and central server 118, and the client device 106. Further, such systems may be asymmetric, with data being transmitted from the headend 102 to the client device 106 via one transmission method, and data being transmitted from the client device 106 to the headend 102 or central server 118 by another transmission method. For example, it is known for headends 102 to transmit media programs to subscribers having client device 106 via satellite, but data to be transmitted from the client device 106 to the headend 102 were central server 118 be transmitted via a wired connection such as 112. For example, the client device 106 may require updated encryption keys on an occasional basis. In such instances, the client device 106 establishes a secure communication channel with the central server via communication link 113 to obtain a license having such encryption keys, or a means of generating them.

As a part of this secure communications channel, the client device 106 and the central server 118 authenticate one another, to verify that each entity is what they claim to be. This is typically accomplished by the exchange of digital certificates signed either by a certificate authority (CA) or in intermediate entity. Accordingly, the client device 106 is typically provisioned with a digital certificate for this purpose. For security purposes, such digital certificates expire after passage of time, and a new certificate must be generated and issued Key Management Protocol In some embodiments, the client device 106 may be provisioned with one or more secret keys and/or authentication certificates, providing pre-existing secret information shared between headend 102 and client device 106. In the absence of such pre-existing secret information public key techniques (e.g., Diffie-Hellman, RSA, etc.) may be used to establish a secret key Ka that is unique to all client devices 106. These techniques have security limitations because of the absence of pre-existing secret keys or authentication certificates in the manufactured STB 410 hardware.

In one or more embodiments, the client device 106 may be preloaded with a second secret key, known only to the headend 102. This second secret key may be programmed in internal EEPROM (electrically erasable programmable read only memory) at manufacture, or pre-loaded in a security chip. In one embodiment, the first secret key Ka is set equal to the embedded second secret key SCK. Having a secret key shared by the client device 106 and the headend 102 another secret key known only to the headend 102 (1) avoids directly exposing second secret key to reverse engineering of the client device 106, and (2) maintain the ability to change the first secret key from time to time, as a security countermeasure and for revocation.

The second secret key may be used as a secret encryption and authentication key, to securely deliver the first secret key and any metadata to the client device 106. Such metadata may define first secret key rules, including the time period for which the first secret key is valid. The headend 102 may deliver the first secret key in a digital certificate or in a first EMM (see below) transmitted to the client device 106.

Entitlement Management Messages (EMM)

Entitlement management messages (EMM) 400 are messages that are used to deliver entitlement keys Ke as well as associated metadata Me, that defines the usage rules of the delivered entitlement keys.

Entitlement keys may be changed on a regular basis (e.g., in the order of days or weeks). Various types of entitlement keys may exist depending on the type of entitlement/authorization. For example, the types of entitlement keys may include:

Broadcast Keys (Kb) for content that is transmitted to all users;

Service Keys (Ks) for the services subscribed to by particular user groups;

Unique Keys (Ku) for delivery of content specifically to a specific user;

Transaction Keys (Kt) for transaction authentication; and

Report back Keys (Kr) for encryption and authentication of report back data.

As a part of the ordinary broadcast protocol, the headend 102 delivers the EMM messages to the client device via an over the air transmission (e.g. by cable 112, satellite 108 or terrestrial transmission 110) or by other communication paths 113, 115. Further, such EMM 400 deliveries may be on a regular or irregular basis, on demand (e.g., when a service is subscribed, or a media object is ordered), and/or on the occurrence of an event (e.g., a system upgrade). However, such delivery is not limited to such specific timing and may occur based on any other type of timing/event determination.

Typically the EMM includes conditional access information that includes an entitlement key Ke encrypted by the secret key and entitlement metadata. As described above, EMMs are delivered to and used to authorize and manage content for the client devices 106.

As described above, an example of an entitlement key Ke may be a transaction key (Kt) for transaction authentication. Once transactions are performed in the client device 106 by the headend 102 (e.g., purchases, usage records, etc.) in accordance with the Kt, the transactions are collected in a transaction record (also referred to as a transaction log) for later report back, or to keep track of the state of entitlement usage (such as when a limited number of uses are authorized/allowed).

Another example of an entitlement key is a report back key (Kr) for encryption and authentication of report back data. In this regard, report back data may be encrypted and authenticated using the report back key Kr.

Entitlement Control Messages (ECM)

Entitlement control messages (ECMs) are used to deliver the specific media content encryption keys Kc, as well as the associated media content metadata Mc, that specifies the usage rules of the media content. The media content encryption keys Kc may be randomly generated by the headend 102 or may be third party keys, supplied to the headend 102 for delivery to the client devices 106 for decryption of the third-party content.

Client Reconfiguration/Redeployment

Figure 2:
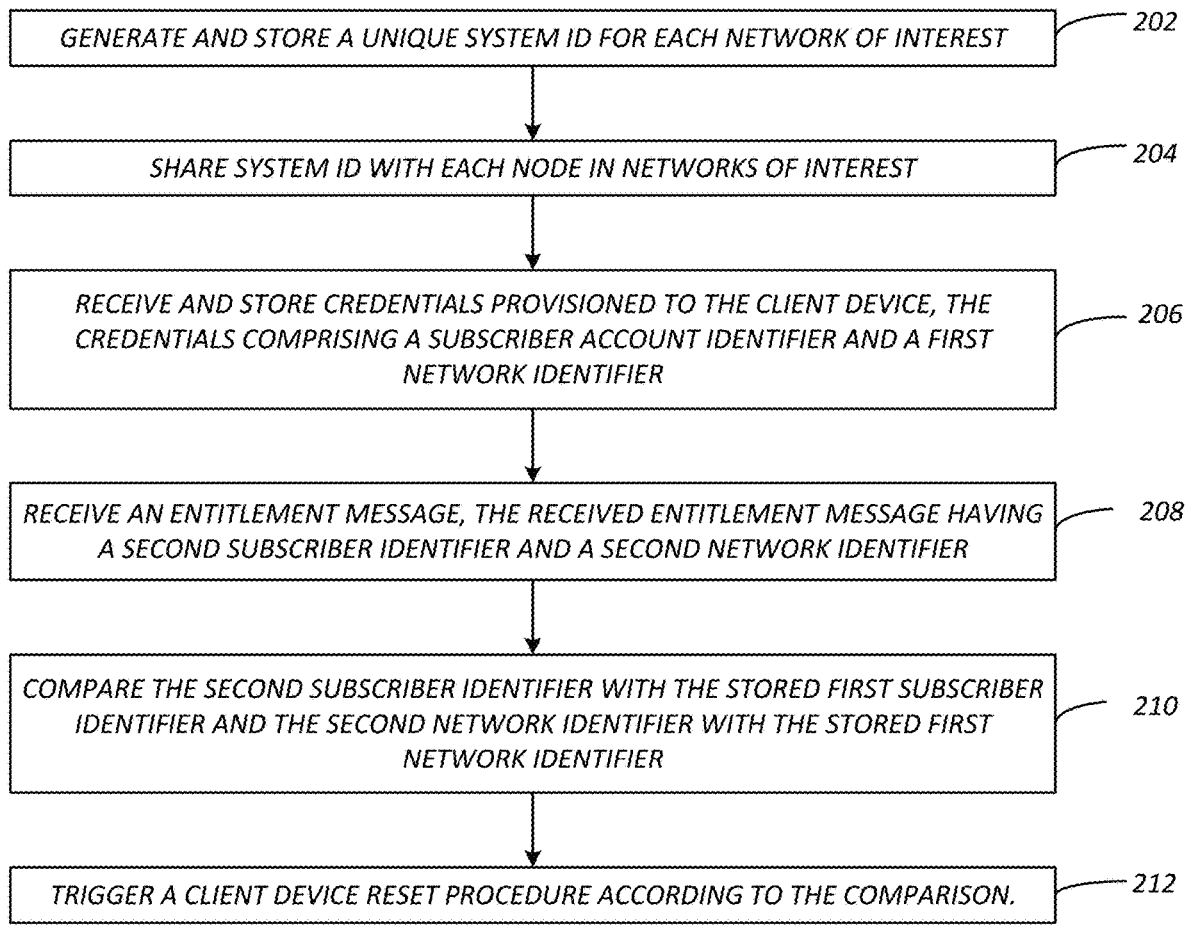
FIG. 2 is a diagram illustrating exemplary operations that can be used to reconfigure a client device for use across multiple subscribers' content distribution networks.
Figure 3:
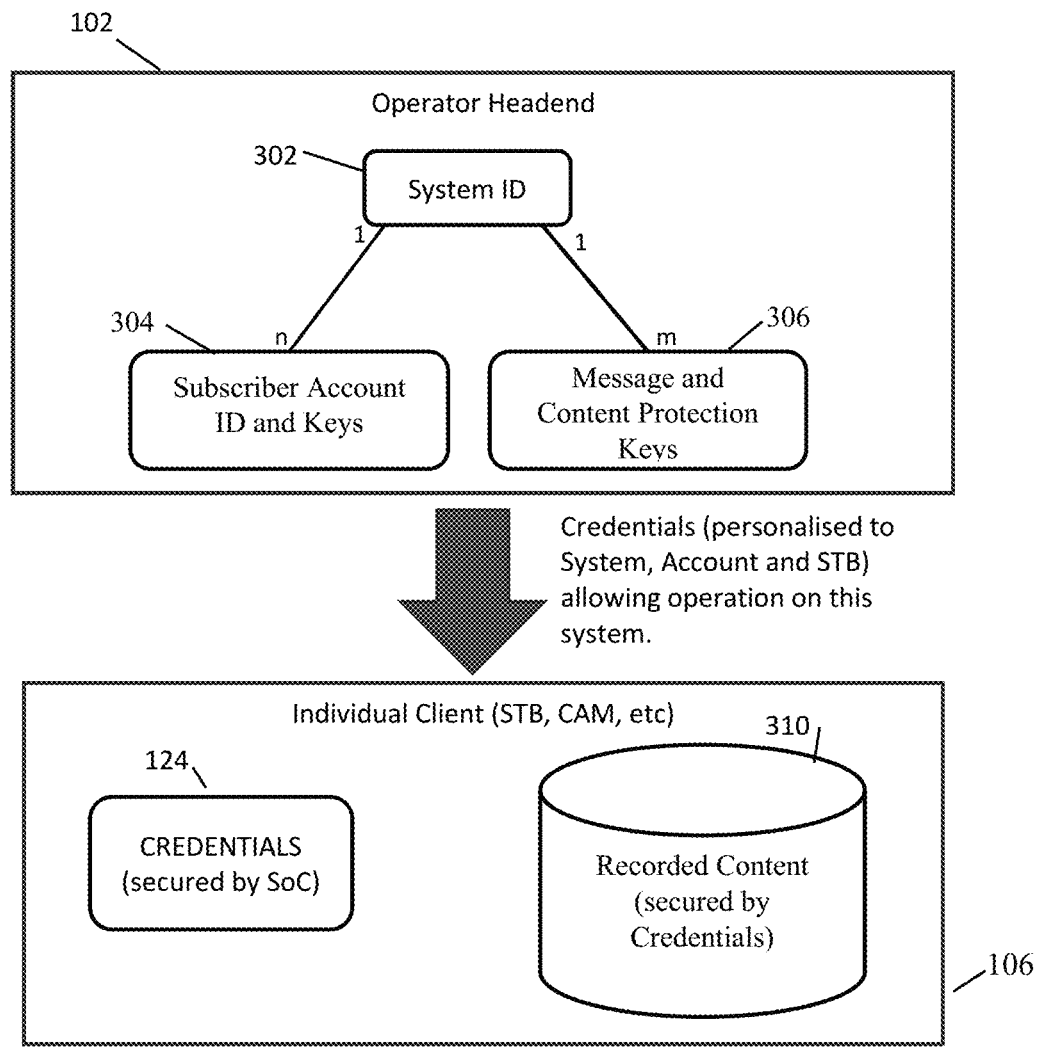
FIG. 3 is a diagram presenting exemplary operations in reconfiguring a client device.
Figure 4:
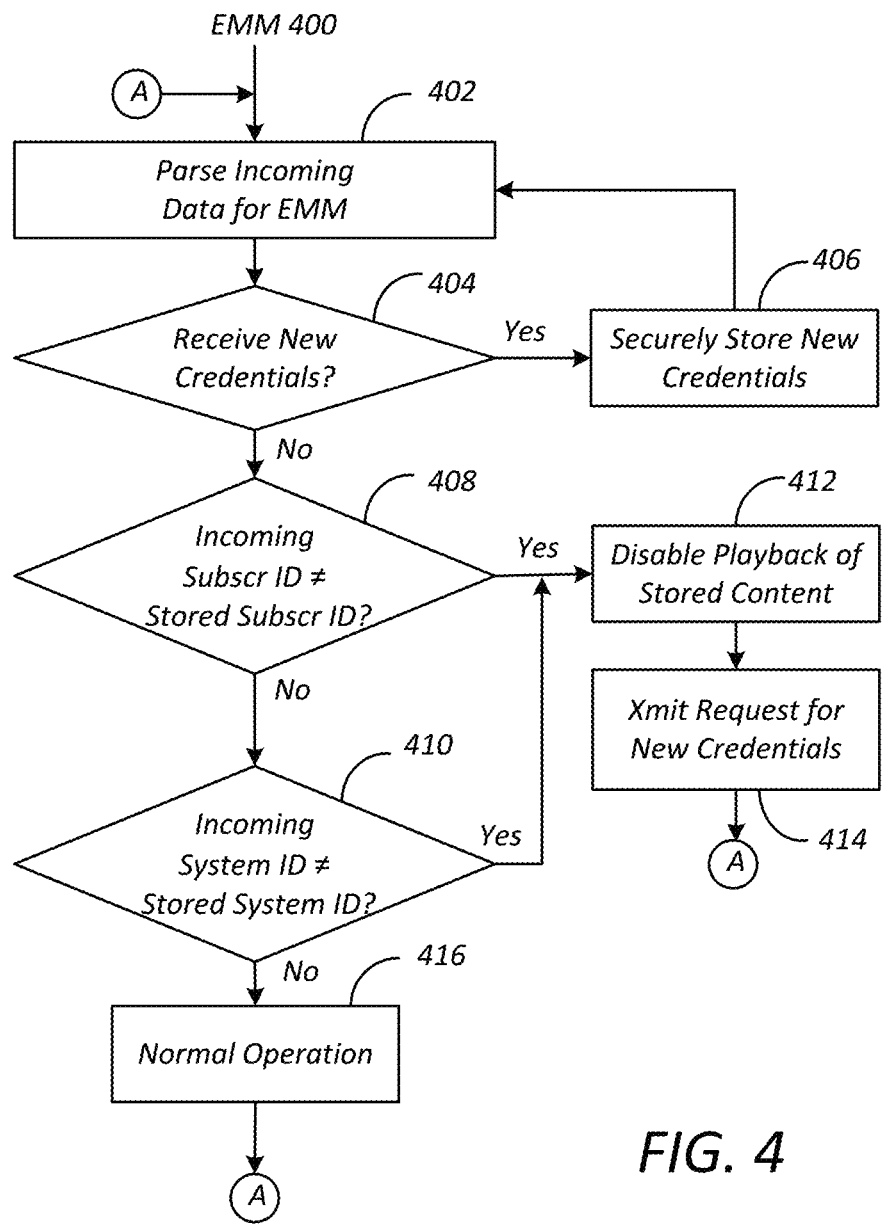
FIG. 4 is a diagram further illustrating the provision of credentials to the client device and the triggering of reset procedures.

FIG. 2 is a diagram illustrating exemplary operations that can be used to reconfigure client devices 106 for use across multiple subscribers or CDNs 100. FIG. 2 will be discussed in connection with FIG. 3 and FIG. 4, which are diagrams illustrating the provision of credentials to the client device 106, and logic in performing triggering operations.

In block 202, a unique system identifier (System ID) 302 is generated. This system ID 302 is individualized (e.g. unique) to each CDN 100 or network of interest. In one embodiment, this occurs at the headend 102 automatically at install time and is of sufficient size and entropy (randomness) to avoid collisions (e.g. duplication wherein different CDNs 100 are granted the same system ID 302). In one embodiment, the System ID comprises a randomly selected globally unique identifier (GUID).

In block 204, the generated system ID 302 is shared with all nodes (e.g. nodes 117) in the CDNs 100, and backed up to allow normal high availability (HA) and disaster recovery operation. This system ID 302 and an identifier of the subscriber account (subscriber ID) 304 is then added to the key management protocol. For example, in the example described above, the system ID 302 and subscriber ID 304 is conveyed in the EMMs that are transmitted to the client devices 106.

As shown in block 206, each client device 106 is initially provisioned with credentials that are received and stored in a secure memory 124 of the client device 106. The credentials include the system ID 302 of the CDN 100 upon which the client device 106 will be initially configured, as well as an identifier of the subscriber account associated with the client device 106 (subscriber ID) 304 which may include a plurality of management keys (e.g. transaction keys Kt, report back keys Kr, and service key Ka if not already provisioned), as well as message and content protection keys 306 such as broadcast keys Kb, service keys Ks, and unique keys Ku).

In one embodiment, this provisioning is accomplished by the client device 106 provider 114, by installing the credentials in the secure memory 124 at the factory or other facility. In another embodiment, the credentials (including the subscriber ID 304 and the System ID 302) are remotely provisioned to the client device 106 in an initial EMM transmitted to the client device 106 by a first CDN 100A, and stored using processing logic of the client device 106. This processing logic is configured to ensure that the system ID 302 and the subscriber ID 304 are securely stored when the client device 106 is authorized. The processing logic further assures that the stored system IDs 302 and subscriber IDs 304 are compared with the system IDs 302 and subscriber IDs 304 received in subsequent EMMs to determine if they match and trigger a reset procedure if they do not. This remote provision of credentials is also illustrated in blocks 402-406 of FIG. 4. These blocks illustrate that the data stream supplied to the client device 106 is parsed to detect EMMs (block 402), and when an incoming EMM is detected, it is analyzed to determine if the contents include new credentials, as shown in block 404. The EMM transmitting these credentials can be one of a plurality of EMMs received via the first CDN 100A according the message protocol described above, each of which may also include an identifier of the first CDN 100A. If new credentials are included, the new credentials are securely stored, as shown in block 406, and processing is routed back to block 402 to parse the incoming data stream for more EMMs 400.

To assure that the EMMs 400 are not tampered with, the any or all of the EMMs may be cryptographically signed before transmission to the client devices 106. For example, the headend 102 can concatenate the subscriber account ID and the system ID 302 and a hash of the concatenated subscriber account ID and system ID 302 can be generated using the secret key Ka provisioned to the client device 106. The hash is added to the EMM before transmission to the client device 106, and the client device 106 may use the shared secret key Ka to regenerate the hash from the received subscriber account ID and system ID 302 and compare that regenerated hash to the hash received as a part of the EMM. Asymmetric keys (whether provided in a digital certificate from a certificate authority (CA) or the headend 102) can also be used to verify that the subscriber account ID and system ID 302 have not been tampered with. The EMM may also be encrypted by the secret key Ka or by a public key of the client device 106 to assure the information included in the EMM is not compromised.

After the initial provisioning of the credentials, the client device 106 receives data transmitted by the headend 102, with such data including encrypted content, ECMs, and EMMs 400, at least a subset of put possibly all of which have a subscriber ID 304 and system ID 302. Block 402 again parses incoming data to identify EMMs in the incoming data stream. Referring back to FIG. 2, block 208 receives the EMM having a second subscriber ID 304 and a second system ID 302. As described above, this EMM 400 may be encrypted and/or signed, and the secret key Ka stored in the client device can be used to verify that the contents of the EMM was not tampered with, and to decrypt the contents of the EMM (if encrypted).

Block 210 compares the second subscriber ID 304 (in the EMM 400 parsed from the data stream with the stored first subscriber ID 304 and also compares the second system ID 302 (also received in the EMM parsed from the data stream) with the stored first system ID 302. This is also evidenced by block 408 and 410 of FIG. 4, which determine if the incoming EMM includes a new System ID or a new Subscriber ID 304 (e.g. the newly received system ID 302 or subscriber ID 304 are different than the earlier received and stored system ID 302 or subscriber ID 304).

Based upon this comparison, block 212 may trigger a client reset procedure, as shown in block 212. For example, referring to FIG. 4, if the incoming EMM 400 does not include a new system ID 302 or subscriber ID 304, the client device 106 continues to operate normally, as shown in block 416. However, if the incoming EMM 400 included a new system ID 302 or a new subscriber ID 304 (the incoming subscriber ID 304 differs from the previously stored subscriber ID 304 or the incoming system ID 302 differs from the incoming system ID 302), processing is routed to block 412, which disables playback of the stored content. In one embodiment, this is accomplished by resetting (e.g. deleting) one or more of the stored entitlement keys Ke. Typically, secret key Ka is retained, as it is needed to securely re-provision credentials. The client device 106 then transmits a request for new credentials, as shown in block 414. This request includes, for example, the subscriber ID 304, and may also include other metadata such as the reasons for the request. Processing is passed back to block 402. Those newly provisioned credentials are typically in an EMM uniquely addressed to the client device 106 requesting them. The data stream is again parsed for EMMs as shown in block 402, and those addressed to the client device are examined to determine if they include newly provisioned credentials. If so, such newly provisioned credentials (which include a newly provisioned subscriber ID 304 and a newly provisioned system ID 302, as well as Ke and any keys required to present content) are securely stored as shown in block 406 and processing is returned to block 402. The previously stored credentials may be overwritten or deleted. Furthermore, any content originally recorded by the client device 106 (e.g. stored in memory 310) may be deleted. The original content may be retained and simply overwritten, as the content will not be decryptable without the proper entitlement keys Ke.

Hardware Environment

Figure 5:
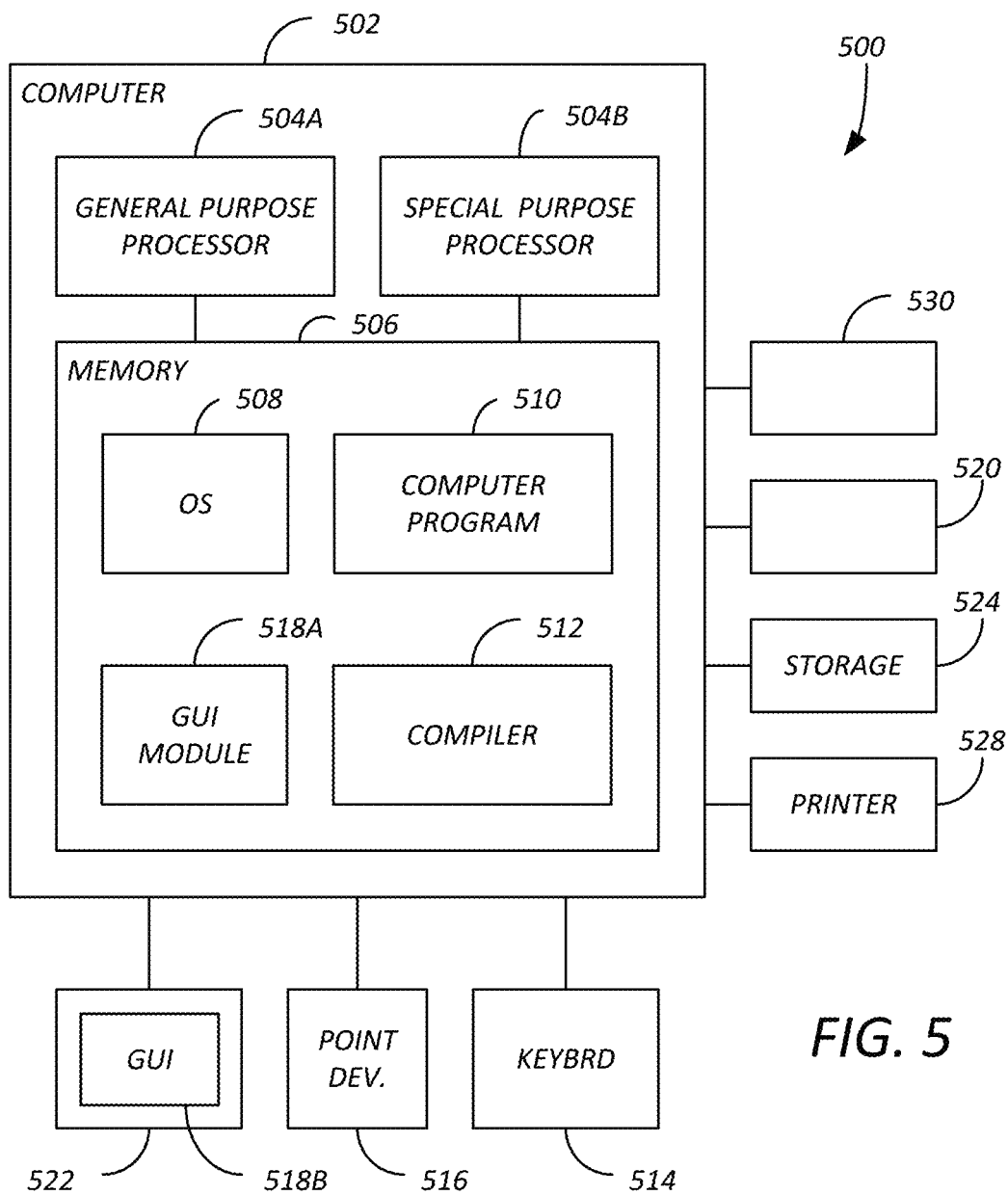
FIG. 5 is a diagram illustrating an exemplary computer system that could be used to implement processing elements of the geolocation system.

FIG. 5 illustrates an exemplary computer system 500 that could be used to implement processing elements of the above disclosure, including the headend 102, central server 118, token server 126, or client device 106 The computer 502 comprises a processor 504 and a memory, such as random access memory (RAM) 506. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518B is depicted as a separate module, the instructions performing the GUI functions can be resident or distributed in the operating system 508, the computer program 510, or implemented with special purpose memory and processors. The computer 502 also implements a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that was generated using the compiler 512. The computer 502 also optionally comprises an external communication device such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the operations herein described. Computer program 510 and/or operating instructions may also be tangibly embodied in memory 506 and/or data communications devices 530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

The foregoing discloses an apparatus, method and system for reconfiguring a client device, that receives a plurality of entitlement messages via a messaging protocol wherein at least a portion of the plurality of entitlement messages including conditional access information including one or more content protection keys for decrypting content provided to and stored by the client device.

One embodiment is evidenced by a method that includes receiving and storing, in secure memory of the client device, credentials provisioned to the client device. The credentials include a subscriber identifier; a first network identifier. The method of reconfiguring also includes receiving an entitlement message having a second subscriber identifier and a second network identifier, comparing the second subscriber identifier with the stored first subscriber identifier and the second network identifier with the stored first network identifier, and triggering a client device reset procedure according to the comparison.

Implementations may include one or more of the following features:

Any of the methods described above, wherein the entitlement message is encrypted and signed by a headend. The method wherein the entitlement message is encrypted and signed according to a key unique to the client device among all client devices of the first network and the second network. Any of the methods described above, wherein the credentials are provisioned in a previous entitlement message received over a first network identified by the first network identifier via the messaging protocol.

Any of the methods described above, wherein the previous entitlement message is one of a plurality of entitlement messages received via the first network according to the message protocol, at least a subset of the plurality of entitlement messages received via the first network also including the first network identifier.

Any of the methods described above, wherein the previous entitlement message is encrypted and signed by a headend.

Any of the methods described above, wherein the previous entitlement message is encrypted and signed according to a key unique to the client device among all client devices of the first network and the second network.

Any of the methods described above, wherein triggering a client device reset procedure according to the comparison includes: triggering the client device reset procedure if either the second subscriber identifier does not match the stored first subscriber identifier or the second network identifier does not match the stored second subscriber identifier.

Any of the methods described above, wherein the client device reset procedure includes: transmitting a request for new credentials, and preventing playback of stored content until newly provisioned credentials are received; receiving, via a further entitlement message, newly provisioned credentials and storing the newly provisioned credentials in the client device persistent memory, the newly provisioned credentials including: a newly provisioned subscriber identifier; a newly provisioned network identifier.

Any of the methods described above, wherein the methods also include deleting the stored credentials from the client device and deleting stored media programs according to the comparison.

Any of the methods described above, wherein the provisioned credentials further include: content protection keys; the newly provisioned credentials further include: newly provisioned content protection keys.

Any of the methods described above, wherein the methods also include the newly provisioned content protection keys are the same as the content protection keys if the second subscriber identifier is the same as the stored first subscriber identifier.

The foregoing also discloses an apparatus for reconfiguring a client device, the client device receiving a plurality of entitlement messages via a messaging protocol, at least a portion of the plurality of entitlement messages including conditional access information including one or more content protection keys for decrypting content provided to and stored by the client device. The apparatus includes a processor; a memory, communicatively coupled to the processor, the memory storing processor instructions. The processor instructions include processor instructions for receiving and storing, in secure memory of the client device, credentials provisioned to the client device, the credentials including: a subscriber identifier; a first network identifier. The processor instructions also include processor instructions for receiving an entitlement message, the received entitlement message having a second subscriber identifier and a second network identifier, and for comparing the second subscriber identifier with the stored first subscriber identifier and the second network identifier with the stored first network identifier. The apparatus of reconfiguring also includes triggering a client device reset procedure according to the comparison.

Implementations may include one or more of the following features:

Any apparatus described above, wherein the entitlement message is encrypted and signed by a headend.

Any apparatus described above, wherein the entitlement message is encrypted and signed according to a key unique to the client device among all client devices of the first network and the second network.

Any apparatus described above, wherein the credentials are provisioned in a previous entitlement message received over a first network identified by the first network identifier via the messaging protocol.

Any apparatus described above, wherein the previous entitlement message is one of a plurality of entitlement messages received via the first network according to the message protocol, at least a subset of the plurality of entitlement messages received via the first network also including the first network identifier.

Any apparatus described above, wherein the previous entitlement message is encrypted and signed by a headend.

Any apparatus described above wherein the previous entitlement message is encrypted and signed according to a key unique to the client device among all client devices of the first network and the second network.

Any apparatus described above, wherein the instructions for triggering a client device reset procedure according to the comparison includes instructions for: triggering the client device reset procedure if either the second subscriber identifier does not match the stored first subscriber identifier or the second network identifier does not match the stored second subscriber identifier.

Any apparatus described above, wherein the client device reset procedure includes instructions for: transmitting a request for new credentials, and preventing playback of stored content until newly provisioned credentials are received; receiving, via a further entitlement message, newly provisioned credentials and storing the newly provisioned credentials in the client device persistent memory, the newly provisioned credentials including: a newly provisioned subscriber identifier; a newly provisioned network identifier. The apparatus may also include deleting the stored credentials from the client device and deleting stored media programs according to the comparison.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of reconfiguring a client device, the client device receiving a plurality of entitlement messages via a messaging protocol, at least a portion of the plurality of entitlement messages comprising conditional access information including one or more content protection keys for decrypting content provided to and stored by the client device, the method implemented in the client device and comprising:
   receiving and storing, in secure memory of the client device, credentials provisioned to the client device, the credentials comprising a subscriber identifier and a first network identifier unique to a first Content Delivery Network (CDN);
   receiving an entitlement message, the received entitlement message having a second subscriber identifier and a second network identifier unique to a second Content Delivery Network (CDN);
   comparing the second subscriber identifier with the stored first subscriber identifier and the second network identifier with the stored first network identifier; and
   triggering a client device reset procedure according to the comparison.

2. The method of claim 1 wherein the entitlement message is encrypted and signed by a headend.

3. The method of claim 2 wherein the entitlement message is encrypted and signed according to a key unique to the client device among all client devices of the first network and the second network.

4. The method of claim 1 wherein the credentials are provisioned in a previous entitlement message received over a first network identified by the first network identifier via the messaging protocol.

5. The method of claim 4 wherein the previous entitlement message is one of a plurality of entitlement messages received via the first network according to the message protocol, at least a subset of the plurality of entitlement messages received via the first network also including the first network identifier.

6. The method of claim 5 wherein the previous entitlement message is encrypted and signed by a headend.

7. The method of claim 6 wherein the previous entitlement message is encrypted and signed according to a key unique to the client device among all client devices of the first network and the second network.

8. The method of claim 1 wherein triggering a client device reset procedure according to the comparison comprises triggering the client device reset procedure if either the second subscriber identifier does not match the stored first subscriber identifier or the second network identifier does not match the stored second subscriber identifier.

9. The method of claim 1 wherein the client device reset procedure comprises:
   transmitting a request for new credentials and preventing playback of stored content until newly provisioned credentials are received;
   receiving, via a further entitlement message, newly provisioned credentials and storing the newly provisioned credentials in the client device persistent memory, the newly provisioned credentials comprising a newly provisioned subscriber identifier and a newly provisioned network identifier; and
   deleting the stored credentials from the client device and deleting stored media programs according to the comparison.

10. The method of claim 9 wherein the provisioned credentials further comprise content protection keys and the newly provisioned credentials further comprise newly provisioned content protection keys, where the newly provisioned content protection keys are the same as the content protection keys if the second subscriber identifier is the same as the stored first subscriber identifier.

11. An apparatus for reconfiguring a client device, the client device receiving a plurality of entitlement messages via a messaging protocol, at least a portion of the plurality of entitlement messages comprising conditional access information including one or more content protection keys for decrypting content provided to and stored by the client device, the apparatus comprising a processor and a memory communicatively coupled to the processor, the memory storing processor instructions for:
   receiving and storing, in secure memory of the client device, credentials provisioned to the client device, the credentials comprising a subscriber identifier and a first network identifier unique to a first Content Delivery Network (CDN);
   receiving an entitlement message, in secure memory of the client device, the received entitlement message having a second subscriber identifier and a second network identifier unique to a second Content Delivery Network (CDN);
   the client device comparing the second subscriber identifier with the stored first subscriber identifier and the second network identifier with the stored first network identifier; and
   triggering a client device reset procedure according to the comparison.

12. The apparatus of claim 11 wherein the entitlement message is encrypted and signed by a headend.

13. The apparatus of claim 12 wherein the entitlement message is encrypted and signed according to a key unique to the client device among all client devices of the first network and the second network.

14. The apparatus of claim 11, wherein the credentials are provisioned in a previous entitlement message received over a first network identified by the first network identifier via the messaging protocol.

15. The apparatus of claim 14 wherein the previous entitlement message is one of a plurality of entitlement messages received via the first network according to the message protocol, at least a subset of the plurality of entitlement messages received via the first network also including the first network identifier.

16. The apparatus of claim 15 wherein the previous entitlement message is encrypted and signed by a headend.

17. The apparatus of claim 16 wherein the previous entitlement message is encrypted and signed according to a key unique to the client device among all client devices of the first network and the second network.

18. The apparatus of claim 11, wherein the instructions for triggering a client device reset procedure according to the comparison comprises instructions for triggering the client device reset procedure if either the second subscriber identifier does not match the stored first subscriber identifier or the second network identifier does not match the stored second subscriber identifier.

19. The apparatus of claim 11, wherein the client device reset procedure comprises instructions for:
   transmitting a request for new credentials, and preventing playback of stored content until newly provisioned credentials are received;
   receiving, via a further entitlement message, newly provisioned credentials and storing the newly provisioned credentials in the client device persistent memory, the newly provisioned credentials comprising a newly provisioned subscriber identifier and a newly provisioned network identifier; and deleting the stored credentials from the client device and deleting stored media programs according to the comparison.

* * * * *